United States Patent
Marco

(10) Patent No.: US 11,785,667 B2
(45) Date of Patent: Oct. 10, 2023

(54) DISCONTINUOUS RECEPTION IN INTERNET OF THINGS APPLICATIONS

(71) Applicant: JRD COMMUNICATION (SHENZHEN) LTD., Guangdong (CN)

(72) Inventor: Olivier Marco, Colombes (FR)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 11 days.

(21) Appl. No.: 17/265,478

(22) PCT Filed: Oct. 22, 2020

(86) PCT No.: PCT/CN2020/122719
§ 371 (c)(1),
(2) Date: Feb. 2, 2021

(87) PCT Pub. No.: WO2021/088650
PCT Pub. Date: May 14, 2021

(65) Prior Publication Data
US 2022/0304102 A1    Sep. 22, 2022

Related U.S. Application Data

(60) Provisional application No. 62/932,268, filed on Nov. 7, 2019.

(51) Int. Cl.
*H04W 76/28* (2018.01)
*H04W 68/02* (2009.01)

(52) U.S. Cl.
CPC .......... *H04W 76/28* (2018.02); *H04W 68/02* (2013.01)

(58) Field of Classification Search
CPC ... H04W 52/0209–0222; H04W 68/02; H04W 76/28; H04W 76/40
See application file for complete search history.

(56) References Cited

U.S. PATENT DOCUMENTS

| | | | |
|---|---|---|---|
| 2016/0044605 A1* | 2/2016 | Vajapeyam | H04W 76/28 370/311 |
| 2016/0050626 A1 | 2/2016 | Chen et al. | |
| 2017/0280473 A1 | 9/2017 | Krishnamoorthy et al. | |
| 2018/0091993 A1* | 3/2018 | Siomina | H04W 52/0216 |

FOREIGN PATENT DOCUMENTS

| | | |
|---|---|---|
| CN | 106060912 A | 10/2016 |
| CN | 106664736 A | 5/2017 |
| CN | 107637142 A | 1/2018 |

(Continued)

OTHER PUBLICATIONS

NB-IoT UE specific DRX—Efficiency Issues, Sequans Communications, 3GPP TSG-RAN WG2 Meeting #109-e, R2-2001630, Feb. 24, 2020, hereinafter Sequans. (Year: 2020).*

(Continued)

*Primary Examiner* — Ronald Eisner
(74) *Attorney, Agent, or Firm* — PV IP PC; Wei Te Chung; Zhigang Ma

(57) ABSTRACT

NB-IoT offers a communication standard for IoT devices in a cellular network. Techniques for providing efficient spectrum management and timely paging of NB-IoT devices are disclosed, including specific DRX cycles for sets of devices in good coverage which require lower latency paging than provided by standard DRX cycles.

14 Claims, 5 Drawing Sheets

(56) References Cited

FOREIGN PATENT DOCUMENTS

| CN | 108282803 A | 7/2018 |
|---|---|---|
| WO | 2014/158268 A1 | 10/2014 |
| WO | 2018016922 A1 | 1/2018 |
| WO | 2018/204703 A1 | 11/2018 |

OTHER PUBLICATIONS

Chinese Office Action issued in corresponding Chinese Patent Application No. 202080006379.0 dated Oct. 21, 2022, pp. 1-14.
"Nb-IoT UE specific DRX—Efficiency Issues", Sequans Communications, 3GPP TSG-RAN WG2 Meeting #109-e, R2-2001630, Feb. 14, 2020.

* cited by examiner

DISCONTINUOUS RECEPTION IN INTERNET OF THINGS APPLICATIONS

CROSS-REFERENCE TO RELATED APPLICATIONS

This application is a National Stage of International patent application PCT/CN2020/122719, filed on Oct. 22, 2020, which claims priority to U.S. Provisional Patent Application No. 62/932,268 filed Nov. 7, 2019, the disclosures of which are incorporated by reference in their entirety.

TECHNICAL FIELD

The following disclosure relates to DRX cycles in NB-IoT systems, and in particular to the application of UE-specific DRX cycles for devices in good coverage and requiring reduced latency services.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

The NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

SUMMARY

There is provided a method of discontinuous reception for paging in a cellular wireless communications system, the method performed at a base station and comprising the steps of transmitting to a UE a default discontinuous reception (DRX) cycle and an allowed minimum cycle for UE-specific DRX cycles in a system information transmission; and in response to a request for a UE-specific DRX cycle from a UE, transmitting an indication of an allowable UE-specific DRX cycle to the UE.

The system information transmission may indicate whether the minimum cycle for UE-specific DRX cycles is activated or deactivated.

The system information transmission may include a value of DRX cycles indicating down to which the minimum UE specific DRX cycle is activated.

The system information transmission may be part of the cell System Information Broadcast.

A final DRX cycle of the UE may be the maximum between the allowable UE-specific DRX cycle, and the allowed minimum UE-specific DRX cycle.

The final DRX cycle of the UE may be the minimum between the said maximum and the default DRX cycle.

A final DRX cycle of the UE may be the maximum between the minimum of the default DRX cycle and the allowable UE-specific DRX cycle, and the allowed minimum UE-specific DRX cycle.

There is also provided a method of discontinuous reception for paging in a cellular wireless communications system, the method performed at a UE and comprising the steps of receiving a default discontinuous reception (DRX) cycle and an allowed minimum cycle for UE-specific DRX cycles in a system information transmission from a base station; transmitting a request for a UE-specific DRX cycle; and receiving an indication of an allowable UE-specific DRX cycle.

The system information transmission may indicate whether the minimum cycle for UE-specific DRX cycles is activated or deactivated.

The system information transmission may include a value of DRX cycles indicating down to which the minimum UE specific DRX cycle is activated.

The system information transmission may be part of the cell System Information Broadcast.

A final DRX cycle of the UE may be the maximum between the allowable UE-specific DRX cycle, and the allowed minimum UE-specific DRX cycle.

The final DRX cycle of the UE may be the minimum between the said maximum and the default DRX cycle.

A final DRX cycle of the UE may be the maximum between the minimum of the default DRX cycle and the allowable UE-specific DRX cycle, and the allowed minimum UE-specific DRX cycle.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
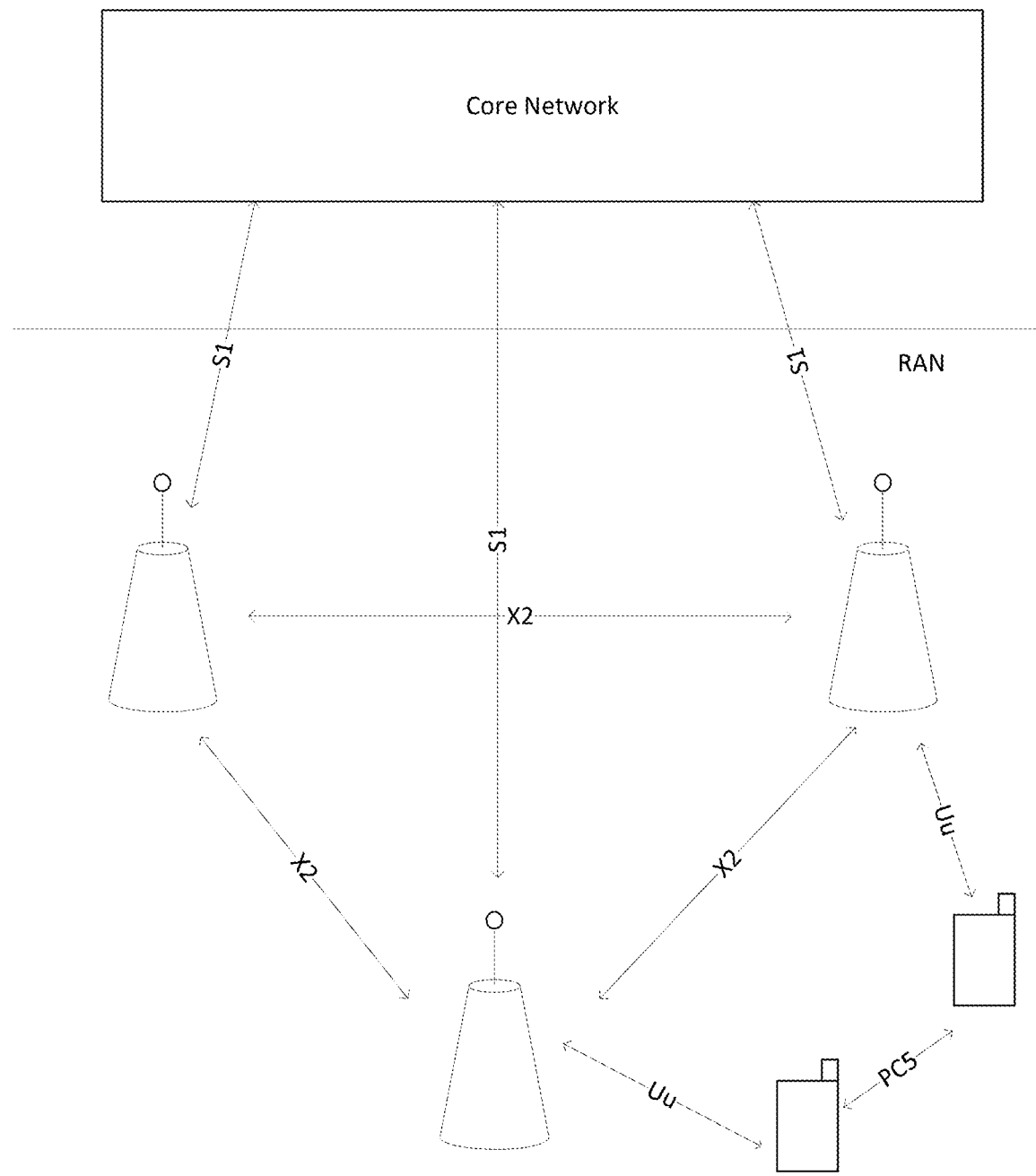
FIG. 1 shows a schematic diagram of selected elements of a cellular communications network.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network. A PC5 interface is provided between UEs for SideLink (SL) communications. The interface and component names mentioned in relation to FIG. 1 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

NB-IoT is a cellular standard originally intended to support low-cost devices which require long battery life, for use with delay-tolerant services. The DRX cycle was defined accordingly and set in Rel-13 of the standard. However, there is now a requirement to use the NB-IoT standards to support devices with tighter latency requirements, for example for use in applications such as connected-bicycles where more rapid communication will improve the user experience. Such services are generally only utilised by UEs in good coverage and therefore the following disclosure focusses on such UEs rather than attempting to provide reduced latency for all UEs.

Long DRX cycles are still attractive and important for devices with requirements which fit the original intent, and reduced latency solutions should thus be retain compatibility with such systems, particular retaining backward compatibility. An ability to define UE-specific DRX cycles may be a solution to reducing latency where the UE-specific cycles are shorter than the general DRX cycle. There is a requirement to ensure that UEs with UE-specific DRX cycles can be efficiently multiplexed with UEs in bad coverage.

Figure 2:
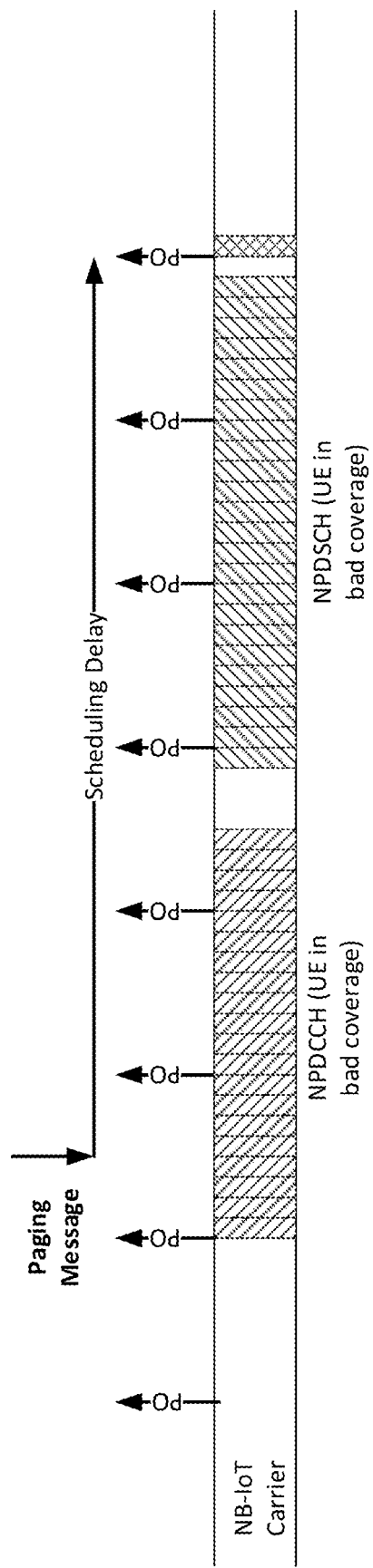
FIG. 2 shows a delayed paging message.

For the feature to be efficient, the eNB shall be able to timely schedule paging for "short DRX" UEs. Delaying the paging is not acceptable as this would mean that the UE actually monitor POs for nothing, as shown in FIG. 2, increasing power consumption for no reachability gain at all. The eNB shall be able to schedule timely UEs using UE specific DRX, so that the feature is useful and the increased UE power consumption is not wasted.

In summary, a UE-specific DRX cycle is introduced which may have a shorter cycle that then standard, general, DRX cycle. For convenience this will be termed a "short DRX cycle", and UE's using such a configuration termed "short DRX UEs". It is expected that only UEs in good coverage will use a short DRX cycle.

Short DRX UEs may be mapped use to different paging carriers than standard UEs and may be mapped to the carriers with different weights. Short DRX UEs may be configured to use gaps in DL transmissions by standard UEs. A minimum DRX cycle length may be defined by a cell for short DRX UEs to avoid or reduce congestion.

The base station ((ng-)eNB) may be able to configure activation of UE-specific DRX cycles, and may specify the parameters available for UEs operating with that configuration. The base station may provide an indication to the Core Network (CN) that short DRX cycles are activated and may provide details of the available configurations. The base station/CN may indicate to UEs in its coverage that short DRX cycles are available either in the SIB or as part of the NAS negotiation (i.e. the CN only indicates that short DRX cycles are available if at least one base station in the relevant Tracking Area (TA) has indicated that that configuration is available. The minimum supported DRX cycle may be included in communications.

Figure 3:
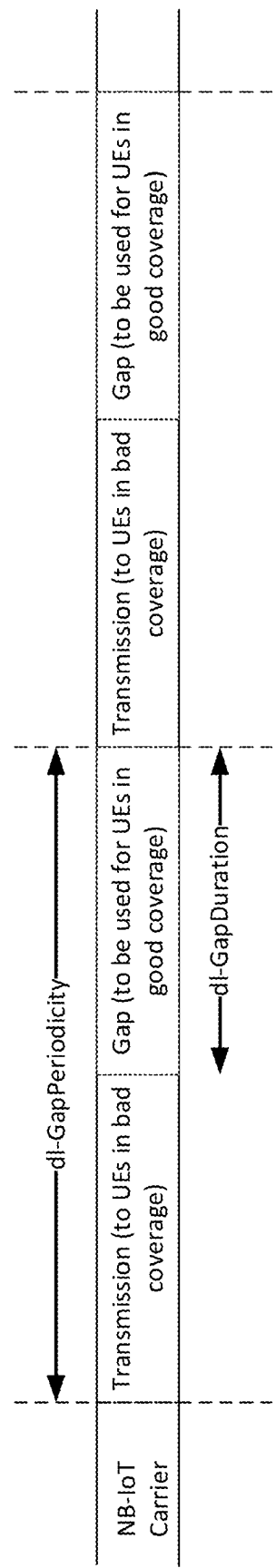
FIGS. 3 & 4 show examples of transmission gaps for UEs in bad coverage.

On each NB-IoT carrier, in DL, UEs are multiplexed in TDD (in contrast to UL which supports FDD within a carrier). A UE in enhanced coverage will require numerous repetitions of a DL transmission to achieved successful reception. For NB-PDCCH repetitions of up to 2048 subframes are supported, and for NB-PDSCH the number of repetitions is $N=Nrep*Nsf$, where Nrep can be up to 2048 and Nsf up to 10. This can lead to a small number of UEs in extended coverage blocking resources for other UEs leading to delays in transmissions to those other UEs, including those in good coverage. This issue has been addressed by introduced a gap pattern such that UEs requiring lots of repetitions are forced to leave gaps between transmissions at certain intervals to allow UEs in good coverage to utilise the transmission resources. FIG. 3 shows an example cycle defining a dl-GapDuration in which only UEs in good coverage may use transmission resources. Whether a given UE applies the pattern or not is decided by comparing Rmax (maximum number of NPDCCH repetitions for the transmission) with a dl-GapThreshold: if Rmax>=dl-GapThreshold, the gap pattern is used, otherwise there are no gaps.

Figure 4:
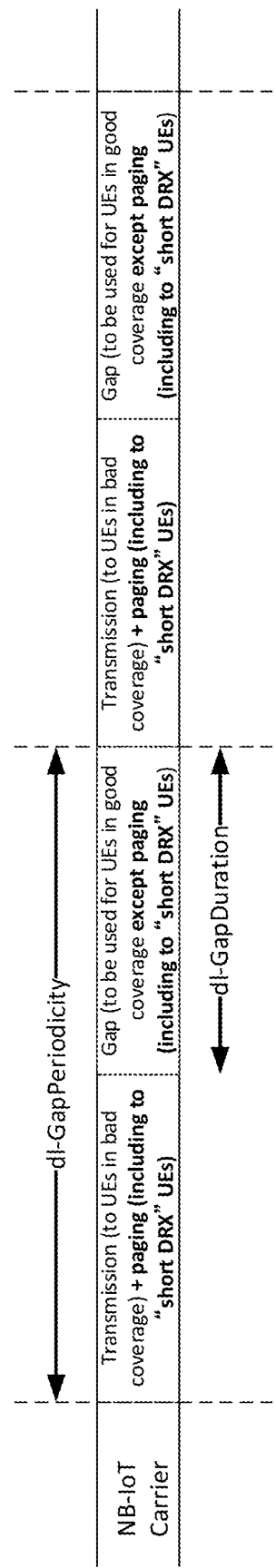

However, the gap-pattern of FIG. 3 has a drawback in that it is only in IDLE mode the gap pattern is applied considering paging CSS Rmax. This means that the gap pattern is applied to all UEs as soon as there is one UE in enhanced/extreme coverage, as shown in FIG. 4. The gap pattern thus forces paging for UEs in good coverage into the reduced resources allocated for bad coverage UEs. The resources for paging good coverage UEs are thus reduced leading to increased congestion in the bad coverage transmission resources and delays to paging the good coverage UEs.

A further issue which may arise is that short DRX UEs in good coverage are more likely (compared a normal DRX UE with longer cycle) to detect paging DCI repetitions targeting the "extreme coverage UEs". This would trigger false paging i.e. useless PDSCH decoding, which would fail.

In legacy LTE systems, a UE specific DRX is "applicable" at the AS layer once the NAS layer has requested (sent in ATTACH or TAU request) the value. However, NB-IoT this approach may not be appropriate due to the requirement for backward compatibility with UEs which can utilise only a standard general DRX cycle. Indeed, in legacy NB-IoT, the UE specific DRX is not supported but this is realized by ignoring (considering as not applicable) any UE specific DRX at AS layer (on UE side) and in Radio Access Network (on NW side), while camped or paging in an NB-IoT cell. That is to say, a legacy NB-IoT UE is allowed to request a UE specific DRX, which will be requested by NAS layer and accepted by the MME, and would be transmitted to an eNB within the PAGING message on S1 interface to such UE, but both the AS layer of the UE and the eNB will ignore (consider not applicable) this UE specific DRX parameter while camped on an NB-IoT cell. The benefit of this mechanism is that NAS layer/Core network implementation does not need to be changed. For instance, a dual mode UE supporting NB-IoT and Cat-M may use same NAS layer requesting same UE specific DRX value whether the UE is camped in LTE (Cat-M) or NB-IoT; the UE specific DRX will be used (considered applicable) only while in a Cat-M cell. Hence, a new mechanism is required in NB-IoT to consider whether a requested UE specific DRX cycle is applicable.

For NB-IoT, UE specific DRX may be "applicable" at AS layer:
1) following a negotiation at the NAS level (the UE has requested a UE specific DRX value, MME/AMF has accepted and/or possibly indicated a UE specific DRX value) and/or
2) from AS level parameters (i.e. the UE has indicated support for UE specific DRX, which could be in AS and/or NAS capability IE, has requested a UE specific DRX value, and is in an NB-IoT cell which supports UE specific DRX feature).

When a UE-specific DRX cycle is used be a UE, the cycle T is selected as the shortest of the UE-specific cycle and the default/standard (cell) cycle (broadcasted in system information). It is anticipated that UE-specific DRX cycle are generally requested when a cycle shorter than the default cycle is desired, and hence the final UE DRX cycle used by the UE will correspond to the UE-specific cycle. However, this is not necessary the case, as the default DRX cycle might also be shortest than the requested or negotiated UE specific DRX cycle.

The term "short DRX UE" is used to indicate a UE that using a UE-specific DRX cycle (meaning the UE specific DRX is "applicable" at AS layer), whether the actual DRX cycle resulting from taking the minimum between UE-specific DRX cycle and default DRX cycle is the UE-specific DRX cycle or not. Generally it shall be the case that UE-specific DRX cycle corresponds to the DRX cycle actually used, as such UEs have typically selected a short DRX cycle to enable faster paging, but it is not necessarily the case. In this approach, even though "short DRX UEs" may not have a resulting DRX cycle always shorter than the default one, there would be considered as UEs that require "short paging latency" and would still be handled differently than other UEs for which the paging may be e.g. postponed by the eNB scheduler.

This can be useful to handle the case where a UE requests a large UE specific DRX cycle (e.g. maximum possible DRX cycle value of 10.24 s), even if such request would not lead to having a different DRX cycle than the default one, as the requested UE specific DRX cycle is always equal or larger than the default one. In the proposed variant, such UE, even if the UE-specific DRX is used (meaning is applicable such as the final DRX cycle will be the minimum of that UE-specific DRX cycle and the default one), the UE would not be considered as a "short DRX UE" because its final DRX cycle is not equal to its UE specific DRX cycle, or is not below a broadcasted threshold.

Whatever the exact definition of "short DRX UE", what is critical is that both the UE and base station are aware if the UE is a "short DRX UE" and thus different configurations can be applied to such UEs compared to standard UEs.

From Rel-14 non-anchor paging carriers can be configured, and weighting can be applied to balance UEs across the available carriers. The configuration is shown below:

```
SystemInformationBlockType22-NB-r14 : := SEQUENCE {
    dl-ConfigList-r14              DL-ConfigCommonList-NB-r14   OPTIONAL,  -- Need OR
    ul-ConfigList-r14              UL-ConfigCommonList-NB-r14   OPTIONAL,  -- Need OR
    pagingWeightAnchor-r14         PagingWeight-NB-r14          OPTIONAL,  -- Cond pcch-config
DL-ConfigCommon-NB-r14 : :=        SEQUENCE {
    dl-CarrierConfig-r14           DL-CarrierConfigCommon-NB-r14,
    pcch-Config-r14                PCCH-Config-NB-r14           OPTIONAL, -- Need OR
    ...,
    [[  wus-Config-r15             WUS-ConfigPerCarrier-NB-r15  OPTIONAL   -- Cond WUS
    ]]
}
PCCH-Config-NB-r14 : :=            SEQUENCE {
    npdcch-NumRepetitionPaging-r14    ENUMERATED {
                                      r1, r2, r4, r8, r16, r32, r64, r128,
                                      r256, r512, r1024, r2048,
                                      spare4, spare3, spare2, spare1} OPTIONAL, -- Need OP
    pagingWeight-r14                  PagingWeight-NB-r14 DEFAULT w1,
    ...
}
PagingWeight-NB-r14 : :=           ENUMERATED {w1, w2, w3, w4, w5, w6, w7, w8,
                                      w9, w10, w11, w12, w13, w14, w15, w16}
NPRACH-ProbabilityAnchor-NB-r14 : :=  SEQUENCE {
    nprach-ProbabilityAnchor-r14      ENUMERATED {
                                      zero, oneSixteenth, oneFifteenth, oneFourteenth,
                                      oneThirteenth, oneTwelfth, oneEleventh, oneTenth,
                                      oneNinth, oneEighth, oneSeventh, oneSixth,
                                      oneFifth, oneFourth, oneThird, oneHalf}
                                      OPTIONAL   -- Need OP
```

This disclosure enables the mapping of short DRX UEs to different carriers and/or with different weights than used for standard UEs. For example, a specific carrier may be allocated which is only used for paging short DRX UEs. The configuration may be enabled by introducing new system information similar to the one found in SystemInformationBlockType22-NBbis, either in a new SIB or as an extension of existing SIB, describing radio resource configuration for paging on non-anchor carriers, but to be used for short DRX UEs only.

This can be realized for instance by adding following extensions in SIB22-NB:

```
SystemInformationBlockType22-NB-r14 : := SEQUENCE {
    dl-ConfigList-r14                       DL-ConfigCommonList-NB-r14      OPTIONAL,   -- Need OR
    ul-ConfigList-r14                       UL-ConfigCommonList-NB-r14      OPTIONAL,   -- Need OR
    pagingWeightAnchor-r14                  PagingWeight-NB-r14             OPTIONAL,   -- Cond pcch-config
    pagingWeightAnchor_short_DRX_UEs-r16        PagingWeight-NB-r14             OPTIONAL,   --
Cond pcch-config
DL-ConfigCommon-NB-r14 : :=             SEQUENCE {
    dl-CarrierConfig-r14                    DL-CarrierConfigCommon-NB-r14,
    pcch-Config-r14                         PCCH-Config-NB-r14              OPTIONAL, -- Need OR
 ...,
    [ [  wus-Config-r15                     WUS-ConfigPerCarrier-NB-r15     OPTIONAL  -- Cond WUS
    ] ]
    pcch-Config_short_DRZ_UEs-r16           PCCH-Config-NB-r14              OPTIONAL, -- Need
OR
 ...,
    [ [  wus-Config short_DRX_UEs-r16       WUS-ConfigPerCarrier-NB-r15     OPTIONAL -
- Cond WUS
    ] ]
}
```

In this option, short DRX UEs can use (be mapped to) a different set of paging carriers. If not configured, short DRX UEs would revert to default (legacy) paging carriers set. The option allows to completely separate normal UEs and short DRX UEs on different paging carriers, which is not possible by using only the weights as unfortunately they cannot be set to 0 (unless for the anchor carrier, but Rel-13 UEs are only using anchor as a paging carrier anyway).

It also allows to have paging for normal UEs and short DRX UEs on the same carrier, with different PCCH parameters (including the paging carrier weights, paging CSS Rmax) or WUS parameters. The pagingWeightAnchor can also be defined separatly for short DRX UEs.

The formula deciding the paging carrier can be similar to the existing formula, except that short DRX UEs would use a separated carrier set along with separated parameters.

In an example, specific paging carrier weights can be defined for short DRX UEs to enable reuse of a non-anchor paging carrier framework which is already defined. The pagingWeightAnchor and/or pagingWeight for each non-anchor carrier can be configured and broadcast with values dedicated for "short DRX UEs".

In a specific example, a system with two non-anchor paging carriers (anchor A, non-anchor B, non-anchor C) may be configured with the following weights:

Standard UE paging weights: A=0, B=16, C=1
Short DRX UE paging weights: A=0, B=1, C=16

This configuration will concentrate short DRX UEs on carrier C, and other UEs be distributed mostly on carriers A & B (For backward compatibility with Rd-13 UEs, the anchor carrier A, even with weight 0, has to support paging of appropriate UEs). For connected traffic, the base station can also use a different carrier than carrier C for UEs in bad coverage so that the carrier C is effectively only available for short DRX UEs. Transmission resources for short DRX UEs are thus not blocked by UEs in bad coverage and hence can be paged quickly.

In a further example, paging parameters, such as the default DRX cycle T and the nB value (PO density), can be defined separately (and differently) for short DRX UEs to optimise paging for the particular services. This may enable better mapping of short DRX UEs into different paging groups and to limit the paging collisions.

It is anticipated that on a given paging carrier, whenever it is needed to reach UEs in bad coverage (even only 1), the cell has to configure default DRX cycle T to a high value, as well as nB. This would lead to short DRX UEs all being mapped to the same time paging group (SFN mod T=0, where T is the requested short DRX). Using specific values of default DRX cycle T and nB would avoid this issue.

There is therefore provided a system in which UEs utilising a UE-specific DRX cycle may be allocated different paging configurations to standard UEs. Those different paging configurations may include different carrier weightings, and different parameter values.

In order to address the problem described above with UEs in good coverage being forced to use transmission resources allocated to UEs in bad coverage for paging, NPDCCH Rmax (npdcch-NumRepetitionPaging) may be defined separately for short DRX UEs. In particular, since the UEs are anticipated to be in good coverage, a smaller Rmax can be defined such that it is less than the threshold for the gap pattern and the short DRX UEs can utilise the good coverage gaps in the transmission resources for paging. Similarly, the WUS-config could be signalled separately for short DRX UEs. The proposed option to define a new carrier set as described above, including pcch-Config_short_DRX_UEs-r16 and wus-Config short_DRX_UEs-r16, covers those requirements.

In a further example, independently of Rmax, short DRX UEs are considered in "good coverage" so that they can use resources independently of the gap pattern.

In a further example, a different gap pattern configuration is configured and used for short DRX UEs, in IDLE mode only or in IDLE and CONNECTED mode.

The principles discussed above can be implemented by amending the standards to specify the conditions under which a UE is considered as a "short DRX UE", such that corresponding alternative parameters are used both at UE side and eNB side. For instance, the condition for a UE to be a short DRX UE may be that UE specific DRX for NB-IoT is used (or applicable at AS layer), such that whenever UE specific DRX is used (or applicable), corresponding alternative parameters are used. Other variants are possible, as described above.

A shorter DRX cycle may be attractive to minimise paging latency, but shorter cycles may lead to higher cell loads or cause congestion in terms of scheduling. This can be for instance due to the fact that multiplexing of several pagings in the same paging message is easier when longer DRX or more delay tolerant paging strategy is used, as the probability to have to page several UEs on the same PO (paging occasion) on the same carrier will increase. In legacy NB-IoT, it is possible to page up to 16 UEs within the same paging message. More generally, on cells with a high load of traffic, especially in cells with a high scheduling load for UEs in bad coverage, it may be difficult to address the timely paging requested by UE specific DRX feature. Typically, in order to be able to page a short DRX UE timely in all cases, the eNB would have to make sure that all POs (paging occasion) of the short DRX UE remains free in case there is a need to page it (i.e. preventing any prior scheduling overlapping with any PO of the short DRX UE), or would have to cancel on-going transmission to other UEs in order to address the paging to the short DRX UE. This is costly in terms of resources and constraining in terms of scheduling.

The base station may be able to configure whether UE-specific DRX cycles are available, and communicate accordingly:

Indication to the CN that the feature is activated (S1/N2) (for example, in ATTACH ACCEPT/TAU ACCEPT for EPC, REGISTRATION ACCEPT for 5GC).

Indication to UE: SIB OR part of the NAS negotiation, i.e. the CN confirms that the use "NB-IoT UE specific DRX" only if a base station from the TA has indicated it is activated). If sent as part of the SIB, the value could be carrier dependant (i.e. it may not be the same on all paging carriers).

These principles may apply for both EPC or 5GC.

The difference with a "support" indication is that the base station may support the feature, but depending of load/traffic conditions, may decide (or be configured via OAM) to activate/deactivate it. This would also address backward compatibility concerns with legacy Rel-13 UEs (such UEs may already signal a UE specific DRX cycle via NAS layer, which is handled transparently by the CN but ignored at UE AS layer and base station).

In a further example, a minimum UE specific DRX cycle, or minimum DRX cycle, may be introduced such that the functionality is available, but scheduling constraints are not too limited. In an example the minimum DRX cycle length ay be 256RFs. In this example, instead of having an indication that the UE-specific DRX is activated or deactivated, the indication is enhanced by a value indicating down to which minimum UE specific DRX cycle it is activated. This enables the feature to be used, even though not to its full extent, while keeping efficiency both in terms of eNB scheduling and UE power consumption.

The indication to the CN may be in the S1 SETUP REQUEST/ENB CONFIGURATION UPDATE messages in the case of EPC, or in the NG SETUP REQUEST/RAN CONFIGURATION UPDATE messages in the case of 5GC.

If the indication to a UE is made as part of the NAS negotiation, the CN can then respond to a UE requesting a UE specific DRX based on the minimum allowed value indicated from all base stations in the TA. For example, a UE may request a DRX cycle of 1.28s, but if the minimum cycle allowed in the TA based on indications from all eNBs in the TA is 2.56s, the CN can respond with a negotiated (agreed) UE specific DRX cycle of 2.56s.

When paging a UE, the CN would then use the negotiated UE specific DRX cycle in the paging message.

It is important that when aggregating the information from the various eNBs in its TA, the CN node (e.g. MME or AMF) only considers the minimum common feature capability as reported by different eNBs. For instance, the feature can be activated (used) only if all eNBs in the TA activates it. The feature can be activated using a minimum DRX of Xms only if all eNBs in the TA indicates they have activated the feature with a minimum DRX equal or lower than Xms. This is because the UE may reselect cells within the TA without any further signalling with the CN. The information given during NAS negotiation shall be applicable for all cells/eNBs within the TA. If the indication to a UE is made as part of the SIB, the UE will consider an effective UE DRX Cycle as equal to the maximum of the requested UE DRX cycle and the allowed minimum UE specific DRX cycle in the SIB. Equivalently, the UE may consider its final DRX cycle (after realizing minimum of requested UE specific DRX cycle, default DRX cycle) as the maximum of that value and the allowed minimum DRX cycle.

As it can be seen, it can be also convenient to have both type of signalling supported simultaneously. The Access Stratum (eNB)/cell level signalling enables a finer granularity and enable for instance an eNB to activate/deactivate/change the minimum DRX value to react to load conditions. The Non Access Stratum (CN)/Tracking Area level signalling enables to aggregate information such as the UE knows whether the feature is used in the TA. This can be used to select other Radio Access Technologies for instance if the feature is available on other RATs.

The MME/AMF is aware of the default paging cycle configuration in a base station and applies an appropriate paging strategy. If different paging cycles are used, the MME/AMF paging strategy may not be adapted. However, since the CN is aware that the feature is activated, or aware of the minimum supported UE specific cycle, the CN can then derive the paging cycle used by the UE. This allows the CN to effectively adapt its paging strategy.

Figure 5:
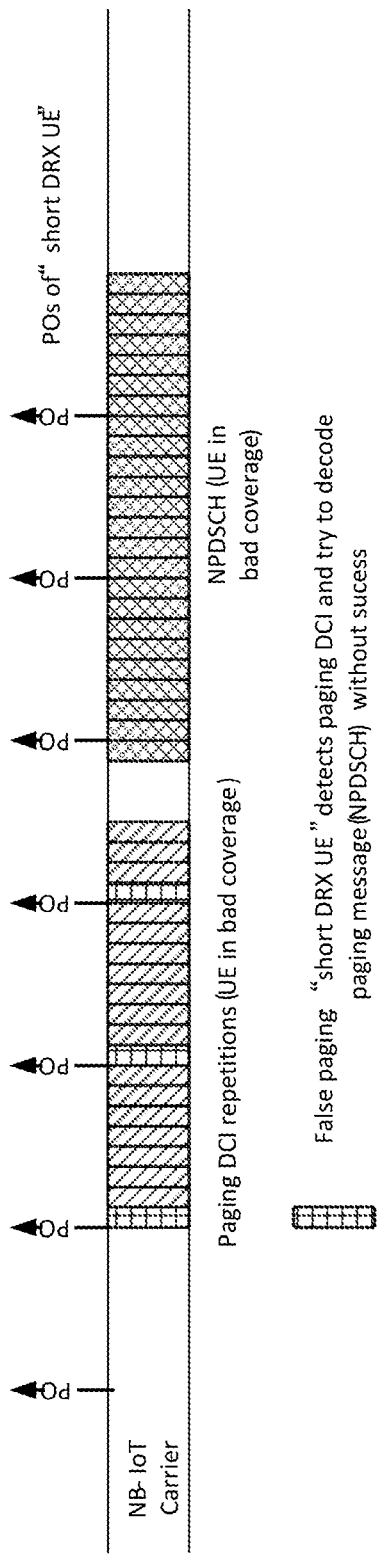
FIG. 5 shows an example of paging timing.

As noted above, an issue with short DRX UEs multiplexed with UEs in bad coverage is that they are more likely (compared a normal DRX UE with longer cycle) to detect paging DCI repetitions targeting the "extreme coverage UEs". This would trigger false paging i.e. useless PDSCH decoding, which would fail, as shown in FIG. 5. In order to address this difficulty, a new, different, P-RNTI may be assigned to short DRX UEs which is used to page those UEs. The short DRX UEs will thus not detect the standard UEs paging DCI (downlink control information) and will thus avoid wasted resource (power consumption) of attempting to decode the corresponding paging messages.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of discontinuous reception for paging in a cellular wireless communications system, the method performed at a base station and comprising the steps of:
    transmitting to a UE a default discontinuous reception (DRX) cycle and an allowed minimum cycle for UE-specific DRX cycles in a system information transmission; and
    in response to a request for a UE-specific DRX cycle from a UE, transmitting an indication of an allowable UE-specific DRX cycle to the UE.

2. The method according to claim 1, where the system information transmission indicates whether the minimum cycle for UE-specific DRX cycles is activated or deactivated.

3. The method according to claim 2, where the system information transmission includes a value of DRX cycles indicating down to which the minimum UE specific DRX cycle is activated.

4. The method according to claim 1, where the system information transmission is part of a cell System Information Broadcast.

5. The method according to claim 1, wherein a final DRX cycle of the UE is a maximum between the allowable UE-specific DRX cycle, and the allowed minimum cycle for UE-specific DRX cycles.

6. The method according to claim 5, wherein the final DRX cycle of the UE is a minimum between the said maximum and the default DRX cycle.

7. The method according to claim 1, wherein a final DRX cycle of the UE is a maximum between a minimum of the default DRX cycle and the allowable UE-specific DRX cycle, and the allowed minimum cycle for UE-specific DRX cycles.

8. A method of discontinuous reception for paging in a cellular wireless communications system, the method performed at a UE and comprising the steps of:
    receiving a default discontinuous reception (DRX) cycle and an allowed minimum cycle for UE-specific DRX cycles in a system information transmission from a base station;
    transmitting a request for a UE-specific DRX cycle; and
    receiving an indication of an allowable UE-specific DRX cycle.

9. The method according to claim 8, where the system information transmission indicates whether the minimum cycle for UE-specific DRX cycles is activated or deactivated.

10. The method according to claim 9, where the system information transmission includes a value of DRX cycles indicating down to which the minimum UE specific DRX cycle is activated.

11. The method according to claim 8, where the system information transmission is part of a cell System Information Broadcast.

12. The method according to claim 8, wherein a final DRX cycle of the UE is a maximum between the allowable UE-specific DRX cycle, and the allowed minimum cycle for UE-specific DRX cycles.

13. The method according to claim 12, wherein the final DRX cycle of the UE is a minimum between the said maximum and the default DRX cycle.

14. The method according to claim 8, wherein a final DRX cycle of the UE is a maximum between a minimum of the default DRX cycle and the allowable UE-specific DRX cycle, and the allowed minimum cycle for UE-specific DRX cycles.

* * * * *